United States Patent
Bian et al.

(10) Patent No.: US 12,265,255 B2
(45) Date of Patent: Apr. 1, 2025

(54) ELECTRO-ABSORPTION MODULATORS WITH STACKED WAVEGUIDE TAPERS

(71) Applicant: GlobalFoundries U.S. Inc., Malta, NY (US)

(72) Inventors: Yusheng Bian, Ballston Lake, NY (US); Steven M. Shank, Jericho, VT (US); Judson Holt, Ballston Lake, NY (US); Michal Rakowski, Ballston Lake, NY (US); Bartlomiej Jan Pawlak, Leuven (BE)

(73) Assignee: GlobalFoundries U.S. Inc., Malta, NY (US)

( * ) Notice: Subject to any disclaimer, the term of this patent is extended or adjusted under 35 U.S.C. 154(b) by 311 days.

(21) Appl. No.: 17/944,252

(22) Filed: Sep. 14, 2022

(65) Prior Publication Data

US 2024/0085624 A1   Mar. 14, 2024

(51) Int. Cl.
  *G02B 6/122*  (2006.01)
  *G02B 6/13*  (2006.01)
(52) U.S. Cl.
  CPC ............. *G02B 6/1228* (2013.01); *G02B 6/13* (2013.01)
(58) Field of Classification Search
  CPC ......... G02B 6/1228; G02B 6/13; G02F 1/011; G02F 1/01708
  See application file for complete search history.

(56) References Cited

U.S. PATENT DOCUMENTS

| | | | |
|---|---|---|---|
| 7,583,869 B2* | 9/2009 | Kang | H01S 5/026 385/129 |
| 10,649,245 B1 | 5/2020 | Bian et al. | |
| 10,910,503 B1 | 2/2021 | Bian et al. | |
| 2018/0231714 A1* | 8/2018 | Collins | G02B 6/26 |
| 2022/0214498 A1* | 7/2022 | Thomson | G02B 6/136 |

OTHER PUBLICATIONS

K. Zang et al., "Germanium Quantum Well QCSE Waveguide Modulator With Tapered Coupling in Distributed Modulator-Detector System," in Journal of Lightwave Technology, vol. 35, No. 21, pp. 4629-4633, 1 Nov. 1, 2017, doi: 10.1109/JLT.2017.2753582.
L. Lever, Z. Ikonić, and R. W. Kelsall, "Adiabatic mode coupling between SiGe photonic devices and SOI waveguides," Optics Express 20, 29500-29506 (2012).
(Continued)

*Primary Examiner* — Marin Pichler
*Assistant Examiner* — Justin Cassell
(74) *Attorney, Agent, or Firm* — Thompson Hine LLP; Anthony Canale (57) ABSTRACT

Structures including an electro-absorption modulator and methods of forming such structures. The structure comprises a waveguide core including a first tapered section, a second tapered section, and a longitudinal axis. The first tapered section and the second tapered section are aligned along the longitudinal axis. The structure further comprises a first waveguide taper overlapping the first tapered section of the waveguide core, a second waveguide taper overlapping the second tapered section of the waveguide core, and a multiple-layer structure on the waveguide core between the first waveguide taper and the second waveguide taper.

20 Claims, 9 Drawing Sheets

(56) References Cited

OTHER PUBLICATIONS

Worawat Traiwattanapong et al., "Design and simulation of waveguide-integrated Ge/SiGe quantum-confined Stark effect optical modulator based on adiabatic coupling with SiGe waveguide." AIP Advances, vol. 11, Issue 3, 10.1063/5.0039129 (2021); https://doi.org/10.1063/5.0039129.

S. A. Srinivasan et al., "60Gb/s waveguide-coupled O-band GeSi quantum-confined Stark effect electro-absorption modulator," 2021 Optical Fiber Communications Conference and Exhibition (OFC), 2021, pp. 1-3.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A Cmos Compatible Monolithic Fiber Attach Solution with Reliable Performance and Self-alignment," in Optical Fiber Communication Conference (OFC), OSA Technical Digest (Optica Publishing Group, 2020), paper Th31.4 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

* cited by examiner

ELECTRO-ABSORPTION MODULATORS WITH STACKED WAVEGUIDE TAPERS

BACKGROUND

The disclosure relates to photonics chips and, more specifically, to structures including an electro-absorption modulator and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An electro-absorption modulator is a type of optical component that may be used to modulate light intensity through the application of an electric field. Some electro-absorption modulators include a quantum well structure that is capable of providing a high extinction ratio by exploiting the quantum-confined Stark effect to vary the absorption spectrum. However, the coupling efficiency with the quantum well structure may be relatively low because of factors such as mode profile mismatch and mismatch of effective refractive indices, which may limit performance.

Improved structures including an electro-absorption modulator and methods of forming such structures are needed.

SUMMARY

In an embodiment of the invention, a structure comprises a waveguide core including a first tapered section, a second tapered section, and a longitudinal axis. The first tapered section and the second tapered section are aligned along the longitudinal axis. The structure further comprises a first waveguide taper overlapping the first tapered section of the waveguide core, a second waveguide taper overlapping the second tapered section of the waveguide core, and a multiple-layer structure on the waveguide core between the first waveguide taper and the second waveguide taper.

In an embodiment of the invention, a method comprises forming a waveguide core including a first tapered section, a second tapered section, and a longitudinal axis. The first tapered section and the second tapered section are aligned along the longitudinal axis. The method further comprises forming a first waveguide taper overlapping the first tapered section of the waveguide core, forming a second waveguide taper overlapping the second tapered section of the waveguide core, and forming a multiple-layer structure on the waveguide core between the first waveguide taper and the second waveguide taper.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
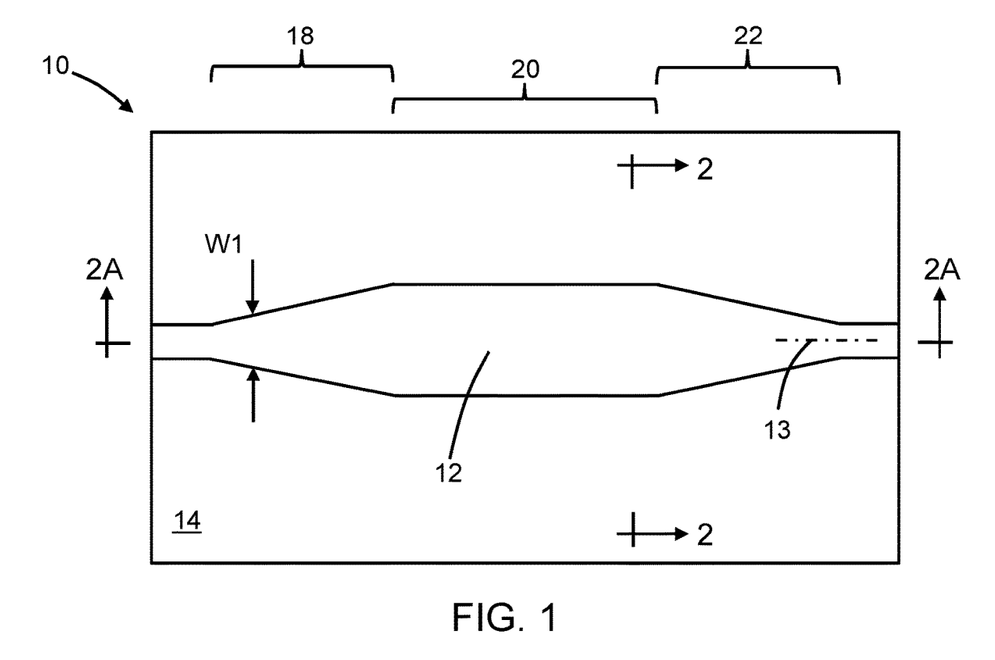
FIG. 1 is a top view of a structure at an initial fabrication stage of a processing method in accordance with embodiments of the invention.
Figure 2:
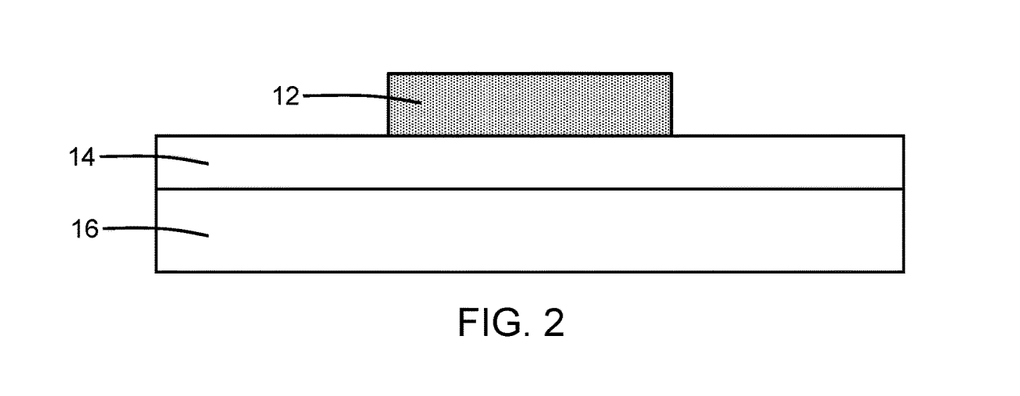
FIG. 2 is a cross-sectional view taken generally along line 2-2 in FIG. 1.
Figure 2A:
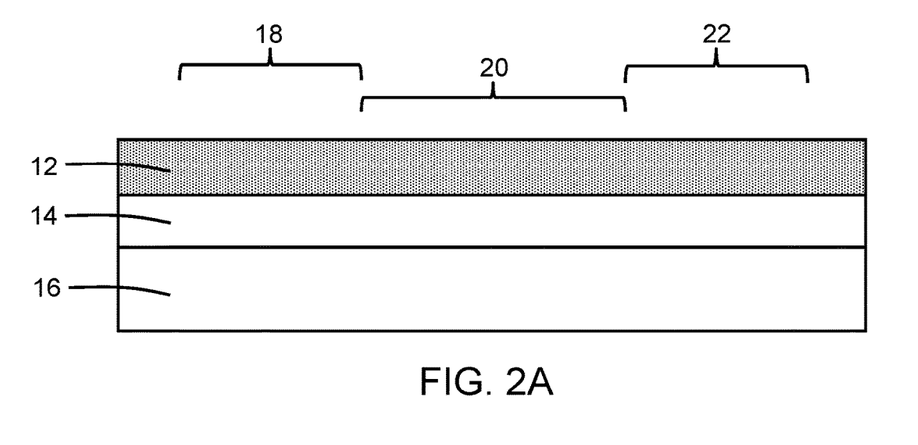
FIG. 2A is a cross-sectional view taken generally along line 2A-2A in FIG. 1.

With reference to FIGS. 1, 2, 2A and in accordance with embodiments of the invention, a structure 10 for an electro-absorption modulator includes a waveguide core 12 that is positioned on a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of a dielectric material, such as silicon dioxide, may be positioned between the dielectric layer 14 and the waveguide core 12.

The waveguide core 12 may include a tapered section 18, a section 20, and a tapered section 22 that are lengthwise aligned along a longitudinal axis 13 of the waveguide core 12 with the section 20 longitudinally between the tapered section 18 and the tapered section 22. The tapered section 18 and the tapered section 22 of the waveguide core 12 may be connected to other optical components. The waveguide core 12 may have a width dimension W1 that varies in the tapered section 18 and the tapered section 22. In an embodiment, the width dimension W1 of the tapered section 18 may longitudinally increase with decreasing distance from the section 20. In an embodiment, the width dimension W1 of the tapered section 22 may also longitudinally increase with decreasing distance from the section 20. The width dimension W1 of the tapered section 18 may longitudinally increase opposite to the longitudinal increase in the width dimension W1 of the tapered section 22. In an embodiment, the width dimension W1 of the tapered sections 18, 22 may linearly increase with decreasing distance from the section 20. In an alternative embodiment, the width dimension W1 of the tapered sections 18, 22 may increase based on a non-linear function, such as a quadratic function, a cubic function, a parabolic function, a sine function, a cosine function, a Bezier function, or an exponential function. In an embodiment, the tapered sections 18, 22 may have a uniform taper angle. In an alternative embodiment, the tapered sections 18, 22 may taper in multiple stages each having a different taper angle. In an embodiment, the section 20 may be non-tapered.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon. In an alternative embodiment, the waveguide core 12 may be comprised of a dielectric material, such as silicon nitride, silicon oxynitride, or aluminum nitride. In alternative embodiments, other materials, such as a polymer or a III-V compound semiconductor, may be used to form the waveguide core 12.

In an embodiment, the waveguide core 12 may be formed by patterning a layer of material with lithography and etching processes. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer of its constituent material (e.g., silicon nitride). In an alternative embodiment, a slab layer may be connected to a lower portion of the waveguide core 12. The slab layer may be formed when the waveguide core 12 is patterned, and the slab layer, which is positioned on the dielectric layer 14, may have a thickness that is less than the thickness of the waveguide core 12.

Figure 3:
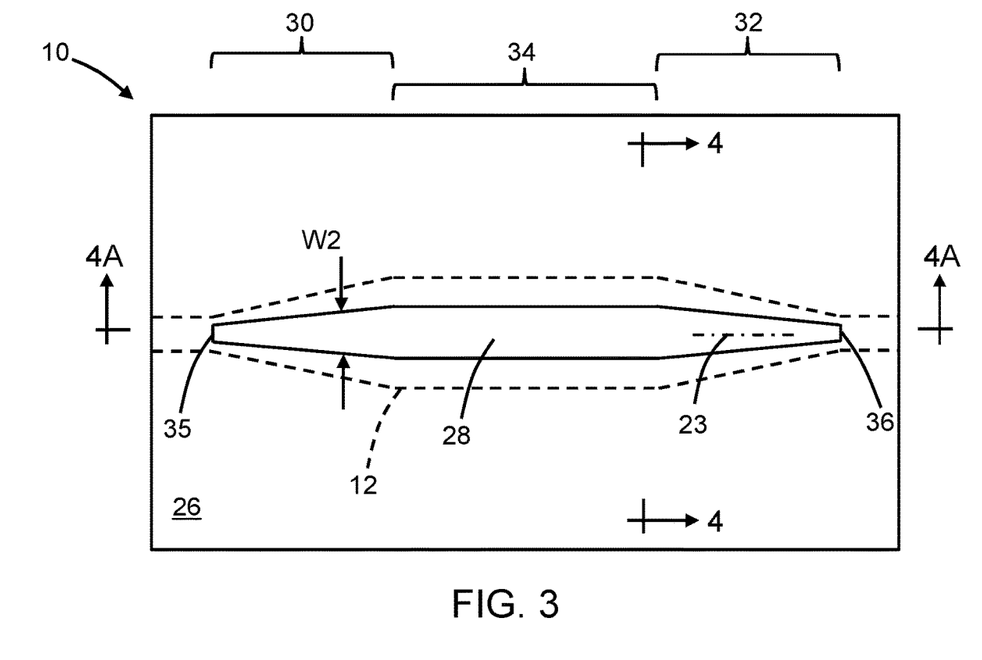
FIG. 3 is a top view of the structure at a fabrication stage of the processing method subsequent to FIG. 1.
Figure 4:
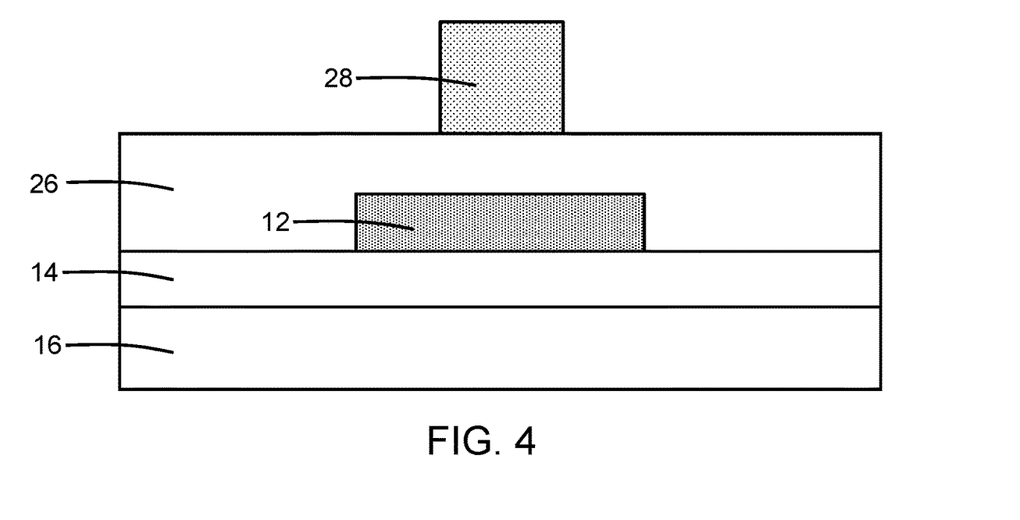
FIG. 4 is a cross-sectional view taken generally along line 4-4 in FIG. 3.
Figure 4A:
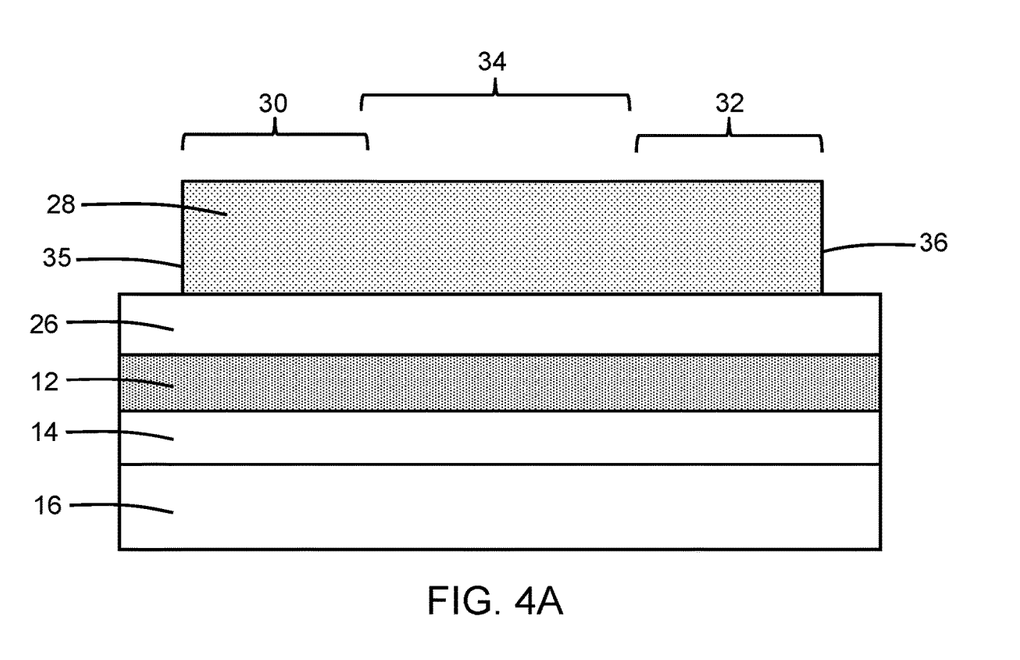
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, a dielectric layer 26 is formed over the waveguide core 12. The dielectric layer 26 may be comprised of a deposited dielectric material, such as silicon dioxide, having a lower refractive index than the dielectric material constituting the waveguide core 12. The waveguide core 12 is embedded in the dielectric layer 26, which may be deposited and planarized after deposition, because the dielectric layer 26 is thicker than the height of the waveguide core 12. The thickness of the dielectric layer 26 and the height of the waveguide core 12 may be adjustable variables.

The structure 10 may further include a waveguide core 28 that is positioned on the dielectric layer 26 and in a different elevation or level within the structure 10 than the waveguide core 12. The waveguide core 28 may include a tapered section 30, a tapered section 32, a section 34, an end 35 that terminates the tapered section 30, and an end 36 that terminates the tapered section 32. The waveguide core 28 may be lengthwise aligned along a longitudinal axis 23 with the section 34 longitudinally between the tapered section 30 and the tapered section 32. The tapered section 30 may be positioned to overlap with the tapered section 18 of the waveguide core 12, and the tapered section 32 may be positioned to overlap with the tapered section 22 of the waveguide core 12.

The waveguide core 28 may have a width dimension W2 that varies in the tapered section 30 and the tapered section 32. In an embodiment, the width dimension W2 of the tapered section 30 may longitudinally increase with increasing distance from the end 35 between a minimum width and a maximum width. In an embodiment, the width dimension W2 of the tapered section 32 may longitudinally increase with increasing distance from the end 36 between a minimum width and a maximum width. The width dimension W2 of the tapered section 30 may longitudinally increase in a direction opposite to the longitudinal increase in the width dimension of the tapered section 32. In an embodiment, the width dimension W2 of the tapered sections 30, 32 may linearly increase with increasing distance from the respective ends 35, 36. In an alternative embodiment, the width dimension W2 of the tapered sections 30, 32 may increase based on a non-linear function, such as a quadratic function, a cubic function, a parabolic function, a sine function, a cosine function, a Bezier function, or an exponential function. In an embodiment, the tapered sections 30, 32 may each have a uniform taper. In an alternative embodiment, the tapered sections 30, 32 may taper in multiple stages each having a different taper angle. In an embodiment, the width dimension W2 of the tapered sections 30, 32 may be less than the width dimension W1 of the tapered sections 18, 22 of the waveguide core 12 over the respective lengths of the tapered sections 30, 32. In an embodiment, the section 34 may be non-tapered.

The waveguide core 28 may be comprised of a material having a refractive index that is greater than the refractive index of silicon dioxide. In an embodiment, the waveguide core 28 may be comprised of a different material than the waveguide core 12. In an embodiment, the waveguide core 28 may be comprised of a dielectric material, such as silicon nitride, silicon oxynitride, or aluminum nitride. In an alternative embodiment, the waveguide core 28 may be comprised of a semiconductor material, such as polysilicon or amorphous silicon. In alternative embodiments, other materials, such as a polymer or a III-V compound semiconductor, may be used to form the waveguide core 28. In an embodiment, the waveguide core 28 may be formed by depositing a layer of its constituent material (e.g., silicon nitride) on the dielectric layer 26 and patterning the deposited layer with lithography and etching processes.

Figure 5:
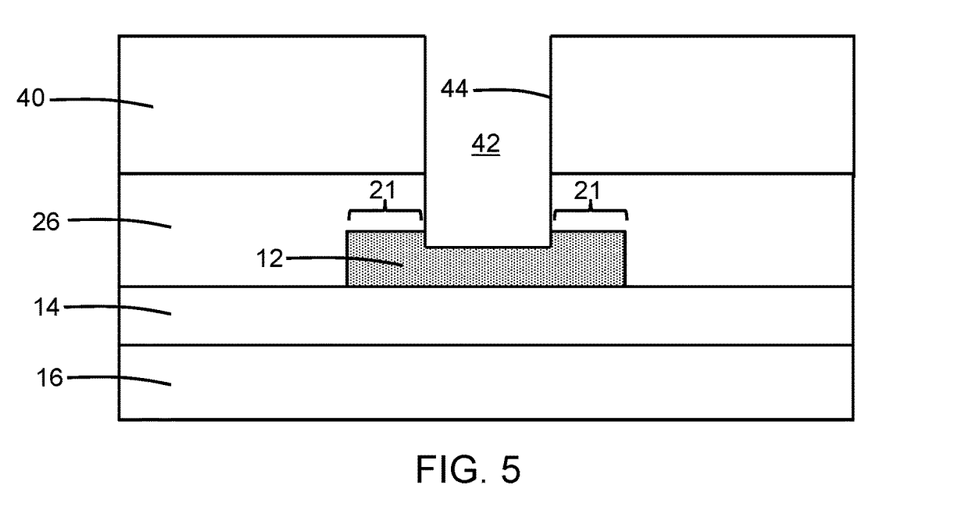
FIGS. 5, 5A are cross-sectional views of the structure at a fabrication stage of the processing method subsequent to FIGS. 4, 4A.
Figure 5A:
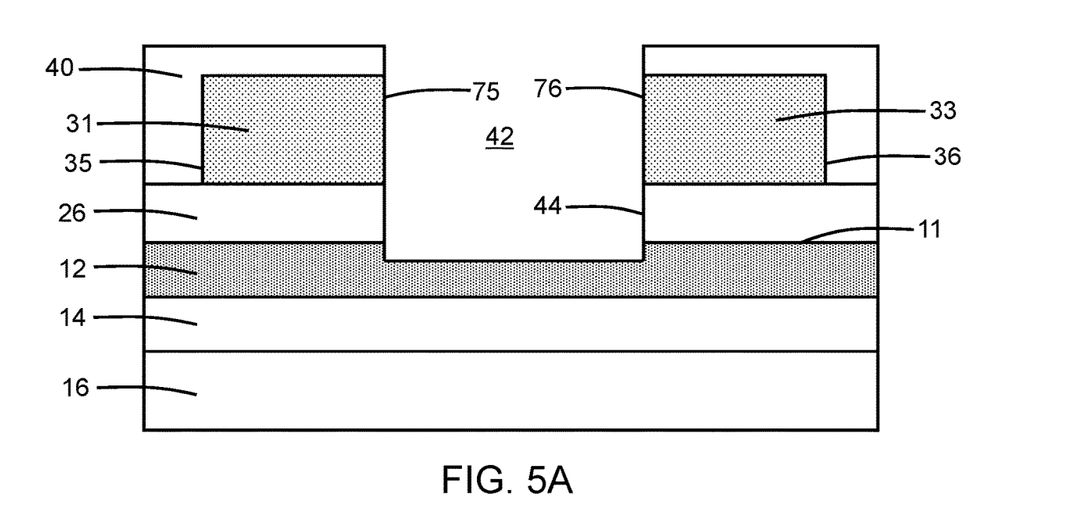

With reference to FIGS. 5, 5A in which like reference numerals refer to like features in FIGS. 4, 4A and at a subsequent fabrication stage, a dielectric layer 40 is formed over the waveguide core 28. The dielectric layer 40 may be comprised of a dielectric material, such as silicon dioxide, having a lower refractive index than the dielectric material constituting the waveguide core 28. The waveguide core 28 is embedded in the dielectric layer 40, which may be deposited and planarized after deposition, because the dielectric layer 40 is thicker than the height of the waveguide core 28. The thickness of the dielectric layer 40 and the height of the waveguide core 28 may be adjustable variables.

The dielectric layer 26, the waveguide core 28, and the dielectric layer 40 may be patterned by lithography and etching processes to define an opening 42. The opening 42 penetrates fully through dielectric layer 26, the waveguide core 28, and the dielectric layer 40 to the waveguide core 12. In an embodiment, the opening 42 may extend to a shallow depth beneath a top surface 11 of the waveguide core 12. In an embodiment, the etching process may be an anisotropic etching process such that the opening 42 has sidewalls 44 that are oriented in a vertical or substantially vertical direction. In alternative embodiments, the sidewalls 44 may be inclined relative to the vertical direction either inwardly or outwardly. Side edge portions 21 of the section 20 of the waveguide core 12 are masked during the etching process and retain the original thickness after the formation of the opening 42.

The waveguide core 28 may be partitioned by the opening 42 such that the section of the waveguide core 28 connecting the tapered sections 30, 32 is removed by the formation of the opening 42. In an embodiment, the section 34 of the waveguide core 28 connecting the tapered sections 30, 32 may be fully removed by the formation of the opening 42. The tapered section 30 is truncated to define a waveguide taper 31, and the tapered section 32 is truncated to define a waveguide taper 33 that is disconnected from the waveguide taper 31. Due to the truncation, the waveguide taper 31 has an end 75 opposite to the end 35, and the waveguide taper 33 has an end 76 opposite to the end 36. The opening 42 is longitudinally arranged between the waveguide taper 31 and the waveguide taper 33. The waveguide taper 31 is stacked with the tapered section 18 of the waveguide core 12 in an overlapping arrangement, and the waveguide taper 33 is stacked with the tapered section 22 of the waveguide core 12 in an overlapping arrangement.

Figure 6:
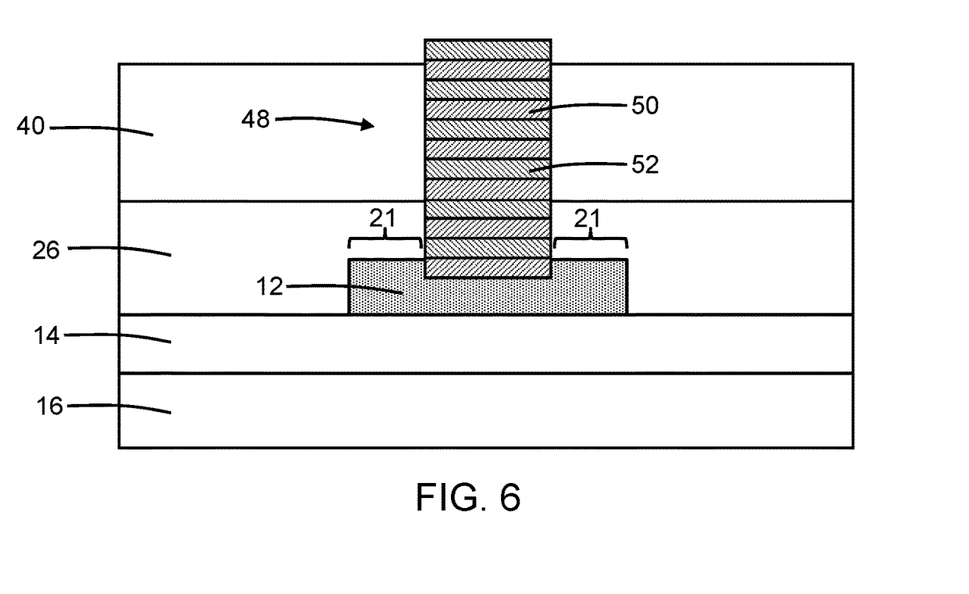
FIGS. 6, 6A are cross-sectional views of the structure at a fabrication stage of the processing method subsequent to FIGS. 5, 5A.
Figure 6A:
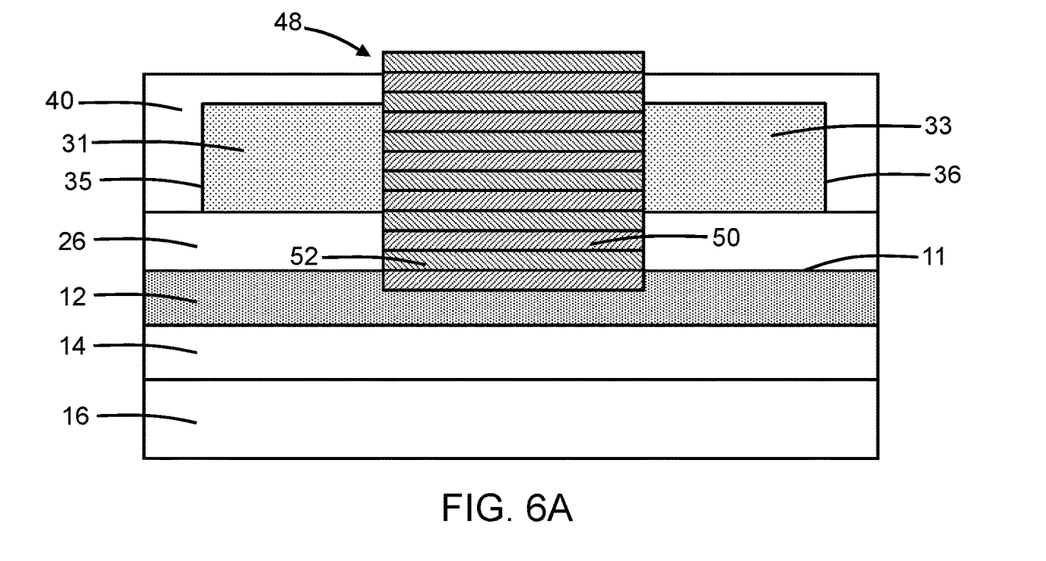

With reference to FIGS. 6, 6A in which like reference numerals refer to like features in FIGS. 5, 5A and at a subsequent fabrication stage, the structure 10 may include a quantum well structure 48 that is formed as a multiple-layer structure inside the opening 42. The quantum well structure 48 may be a superlattice that includes layers 50 and layers 52 that alternate in a periodic manner with the layers 50. Each of the layers 50, 52 may have a thickness on the order of a few nanometers. A lower portion of the quantum well structure 48 may be positioned in the opening 42 below the top surface 11 of the waveguide core 12. In an embodiment, an upper portion of the quantum well structure 48 may project above the upper surfaces of the waveguide tapers 31, 33. In an alternative embodiment, an upper portion of the quantum well structure 48 may be coplanar with the respective upper surfaces of the waveguide tapers 31, 33.

In an embodiment, the layers 50 may be comprised of a different material than the layers 52. In an embodiment, the layers 50 and the layers 52 may be comprised of materials with different compositions. In an embodiment, the layers 50 may be comprised of silicon-germanium, and the layers 52 may be comprised of silicon-germanium with a germanium content that is greater than the germanium content of the layers 50. In an embodiment, the layers 50 may be comprised of silicon-germanium with a germanium content of about 5 atomic percent, and the layers 52 may be comprised of silicon-germanium with a germanium content of about 30 atomic percent. In an alternative embodiment, the layers 50 may be comprised of a III-V compound semiconductor, and the layers 52 may be comprised of a different III-V compound semiconductor. In an alternative embodiment, the layers 50 may be comprised of gallium arsenide, and the layers 52 may be comprised of aluminum gallium arsenide. The layers 50, 52 of the lower portion of the quantum well structure 48 may be tailored in composition and/or thickness to provide a buffer layer that accommodates lattice mismatch and provides strain relief.

In an embodiment, the waveguide taper 31 may directly contact (i.e., abut) one end of the quantum well structure 48. In an embodiment, the end 35 of the waveguide taper 31 is longitudinally spaced from the quantum well structure 48, and the end 75 (FIG. 5A) of the waveguide taper 31 may abut the quantum well structure 48. In an embodiment, the waveguide taper 33 may directly contact (i.e., abut) an opposite end of the quantum well structure 48. In an embodiment, the end 36 of the waveguide taper 33 is longitudinally spaced from the quantum well structure 48, and the end 76 (FIG. 5A) of the waveguide taper 33 may abut the quantum well structure 48.

Figure 7:
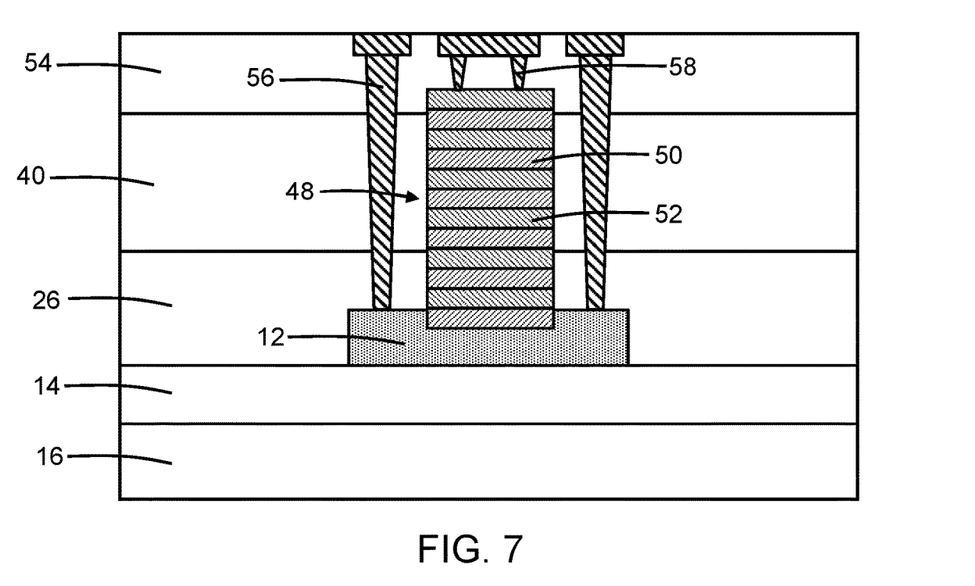
FIGS. 7, 7A are cross-sectional views of the structure at a fabrication stage of the processing method subsequent to FIGS. 6, 6A.
Figure 7A:
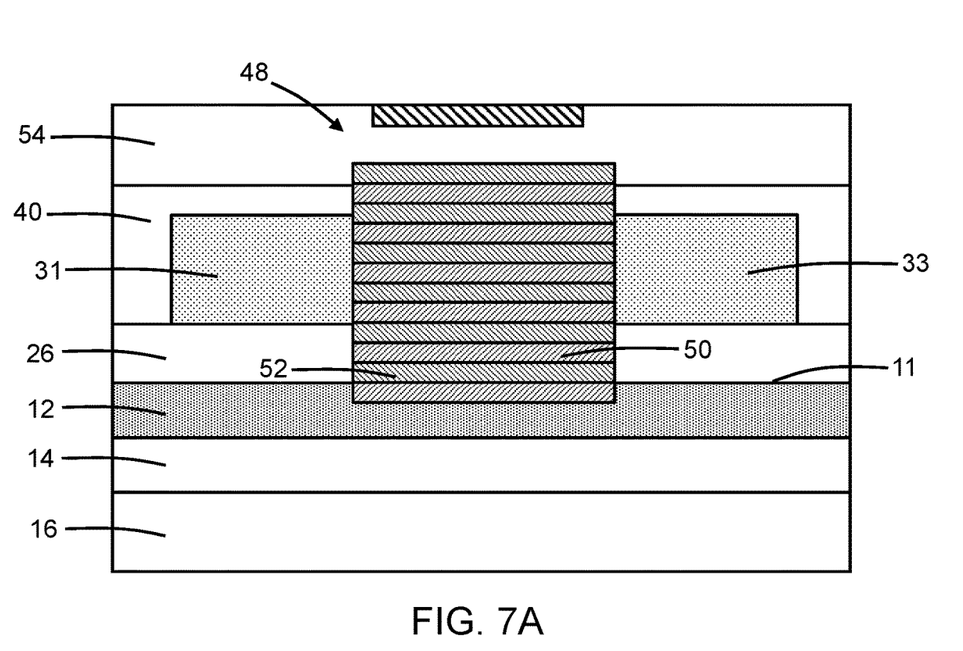

With reference to FIGS. 7, 7A in which like reference numerals refer to like features in FIGS. 6, 6A and at a subsequent fabrication stage, a back-end-of-line stack 54 may be formed over the dielectric layer 40 and the quantum well structure 48. The back-end-of-line stack 54 may include stacked dielectric layers that are each comprised of a dielectric material, such as silicon dioxide, silicon nitride, tetraethylorthosilicate silicon dioxide, or fluorinated-tetraethylorthosilicate silicon dioxide. The back-end-of-line stack 54 may include electrical connections 58, 60 that are coupled to the waveguide core 12 and the quantum well structure 48 for powering the quantum well structure 48.

The waveguide tapers 31, 33 of the structure 10 may be effective to reduce the refractive index mismatch between the light mode in the waveguide core 12 and the light mode in the quantum well structure 48. The waveguide tapers 31, 33 may be effective to increase the modal overlap and coupling efficiency between the light mode in the waveguide core 12 and the light mode in the quantum well structure 48. The waveguide tapers 31, 33 may also reduce optical return loss (i.e., back reflection).

In alternative embodiments, the electro-absorption modulator may be replaced by a different type of active optical component structured with multiple-layers, such as a detector or a laser. For the multiple-layer structure, the stacking of the waveguide tapers 31, 33 with the tapered sections 18, 22 of the waveguide core 12 may reduce the refractive index mismatch, increase the modal overlap and coupling efficiency, and/or reduce back reflection.

Figure 8:
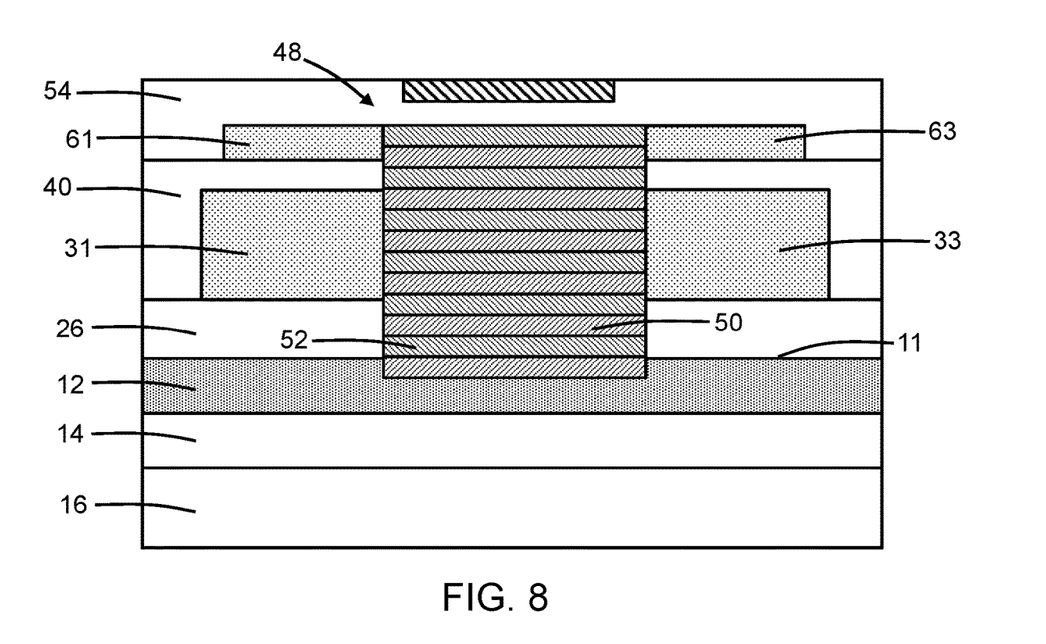
FIG. 8 is a cross-sectional view of a structure in accordance with alternative embodiments of the invention.

With reference to FIG. 8 and in accordance with alternative embodiments, waveguide tapers 61, 63 that are similar to the waveguide tapers 31, 33 may be formed over the waveguide tapers 31, 33. In an embodiment, the waveguide tapers 61, 63 may be formed in the same manner as the waveguide tapers 31, 33. In an embodiment, the waveguide tapers 61, 63 may be comprised of the same material as the waveguide tapers 31, 33. In an embodiment, the waveguide tapers 61, 63 may be comprised of a different material than the waveguide tapers 31, 33. The added waveguide tapers 61, 63, which also overlap with the tapered sections 18, 22 of the waveguide core 12, may further reduce the refractive index mismatch, further increase the modal overlap and coupling efficiency, and/or further reduce back reflection.

In an embodiment, the waveguide tapers 61, 63 may be shorter in length and narrower in width than the waveguide tapers 31, 33. In alternative embodiments, one or more additional sets of waveguide tapers may be formed over the waveguide tapers 61, 63. In an embodiment, the existence of multiple waveguide tapers that overlap with the tapered sections 18, 22 of the waveguide core 12 may be particularly applicable to embodiments in which the quantum well structure 48 is replaced as the multiple-layer structure by a laser.

Figure 9:
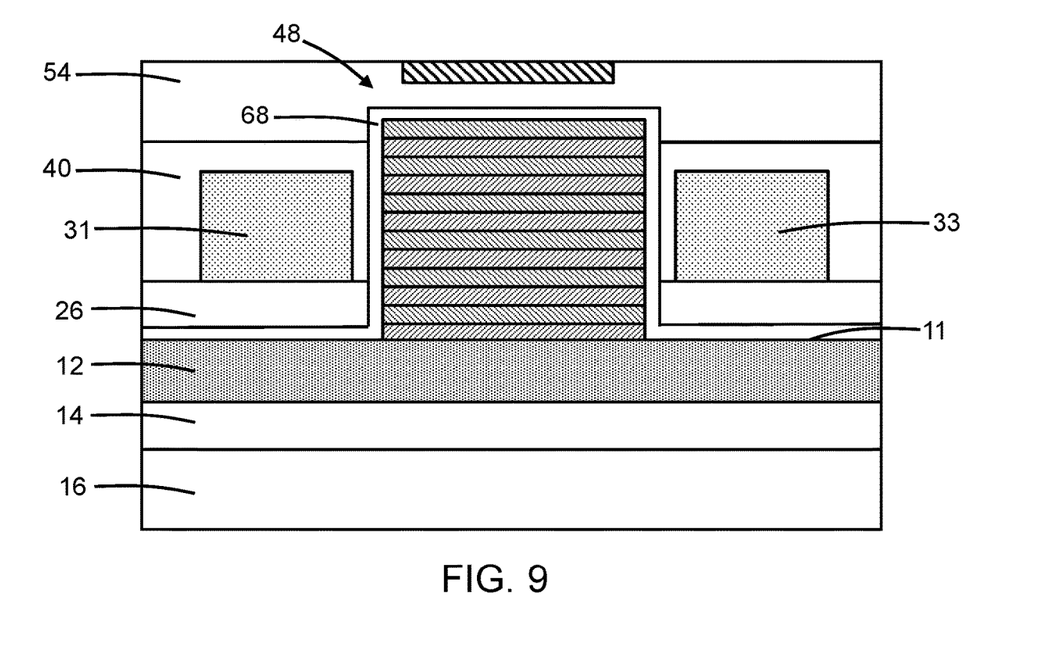
FIG. 9 is a cross-sectional view of a structure in accordance with alternative embodiments of the invention.

With reference to FIG. 9 and in accordance with alternative embodiments, a conformal layer 68 may be formed on the quantum well structure 48 and the adjacent surfaces of the waveguide core 12. The conformal layer 68 may be comprised of a dielectric material, such as silicon nitride. The conformal layer 68 may be applied on the exterior surfaces of the quantum well structure 48 as a protective coating in an embodiment in which the quantum well structure 48 is formed by deposition of the layers 50, 52 and patterning before forming the waveguide tapers 31, 33. In the representative embodiment, the quantum well structure 48 may directly contact the top surface 11 of the waveguide core 12 and may be positioned fully above the top surface 11.

Figure 10:
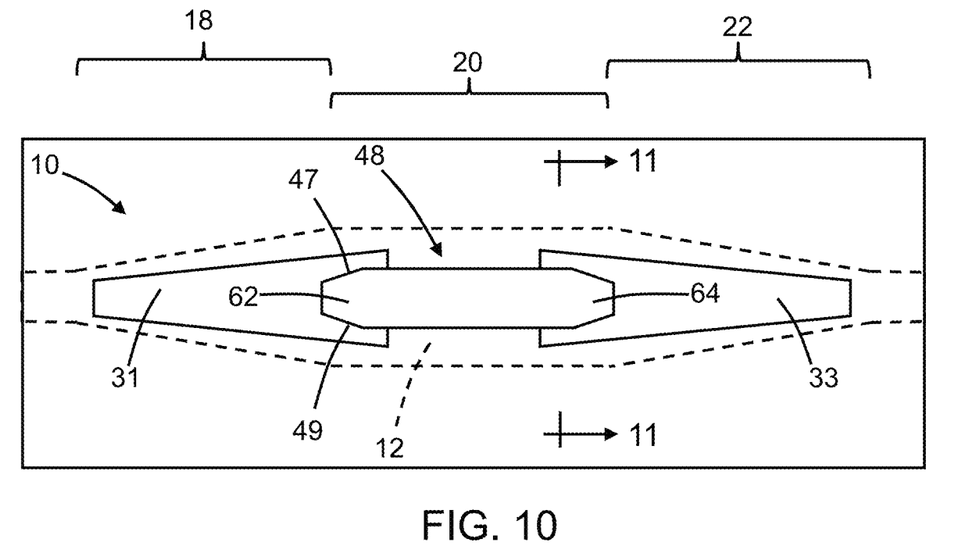
FIG. 10 is a diagrammatic top view, which is simplified for purposes of illustration, of a structure in accordance with alternative embodiments of the invention.
Figure 11:
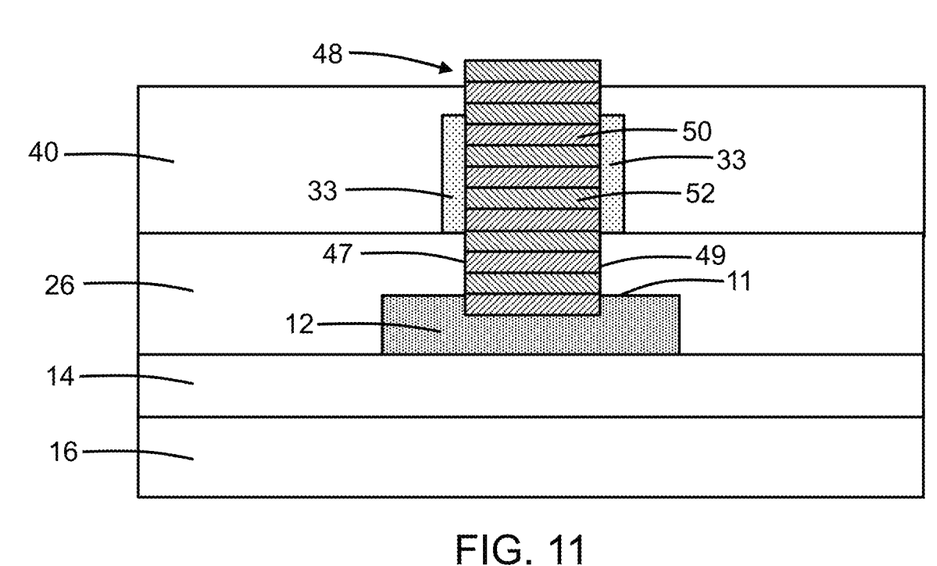
FIG. 11 is a cross-sectional view taken generally along line 11-11 in FIG. 10.

With reference to FIGS. 10, 11 and in accordance with alternative embodiments, the waveguide taper 31 may wrap around an end portion 62 of the quantum well structure 48, and the waveguide taper 33 may wrap around an end portion 64 of the quantum well structure 48. The quantum well structure 48 is terminated at one end by the end portion 62, and the quantum well structure 48 is terminated at an opposite end by the end portion 64. In an embodiment, the end portions 62, 64 wrapped by the waveguide tapers 31, 33 may be tapered. The quantum well structure 48 has a sidewall 47 and a sidewall 49 opposite to the sidewall 47, and both of the sidewalls 47, 49 may be contacted by the wrap-around waveguide tapers 31, 33. In an embodiment, the end portion 62 may be tapered in the same direction as the waveguide taper 31, and the end portion 64 may be tapered in the same direction as the waveguide taper 33. In an alternative embodiment, the waveguide tapers 31, 33 may be clad by an outer layer comprised of a different dielectric material, such as silicon dioxide.

Figure 12:
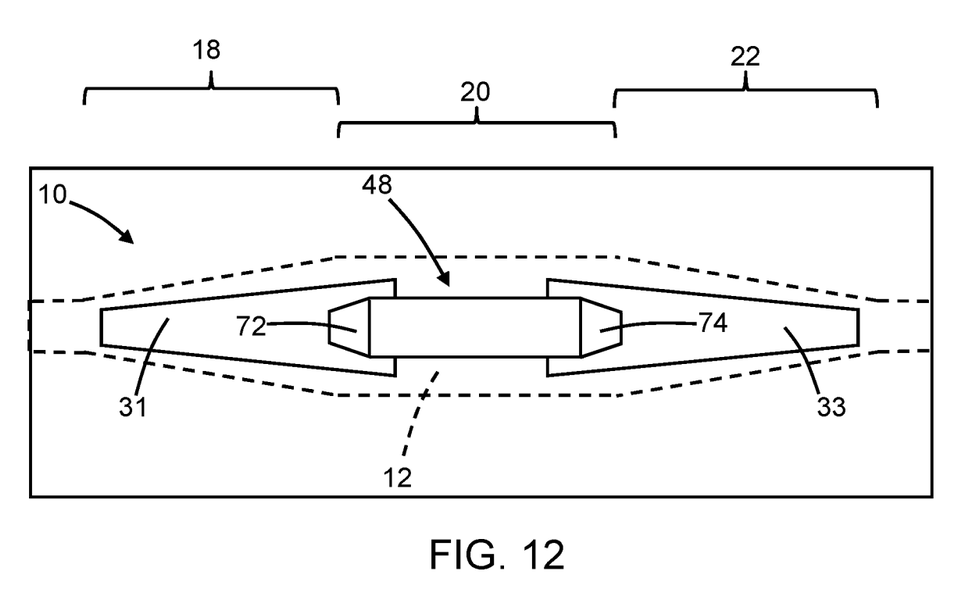
FIG. 12 is a diagrammatic top view, which is simplified for purposes of illustration, of a structure in accordance with alternative embodiments of the invention.

With reference to FIG. 12 and in accordance with alternative embodiments, the structure 10 may include waveguide tapers 72, 74 that are formed separately from the quantum well structure 48. The quantum well structure 48 is positioned between the waveguide taper 72 and the waveguide taper 74. The waveguide taper 72 is positioned between the waveguide taper 31 and the quantum well structure 48. The waveguide taper 74 is positioned between the waveguide taper 33 and the quantum well structure 48. The waveguide taper 31 may wrap around the waveguide taper 72 and a portion of the quantum well structure 48 adjacent to the waveguide taper 72. The waveguide taper 33 may wrap around the waveguide taper 74 and a portion of the quantum well structure 48 adjacent to the waveguide taper 74.

In an embodiment, the waveguide tapers 72, 74 may be comprised of a different material than the waveguide tapers 31, 33. In an embodiment, the waveguide tapers 72, 74 may be comprised of a different material than the waveguide core 12. In an embodiment, the waveguide tapers 72, 74 may be comprised of a different material than the waveguide core 12 and the waveguide tapers 31, 33. In an embodiment, the waveguide tapers 72, 74 may be comprised of polysilicon.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a waveguide core including a first tapered section, a second tapered section, and a longitudinal axis, the first tapered section and the second tapered section aligned along the longitudinal axis;
   a first waveguide taper overlapping the first tapered section of the waveguide core;
   a second waveguide taper overlapping the second tapered section of the waveguide core; and
   a multiple-layer structure on the waveguide core between the first waveguide taper and the second waveguide taper, the multiple-layer structure having a first end portion and a second end portion opposite to the first end portion,
   wherein the first waveguide taper wraps around the first end portion, and the second waveguide taper wraps around the second end portion.

2. The structure of claim 1 wherein the first waveguide taper abuts the first tapered section of the waveguide core.

3. The structure of claim 2 wherein the second waveguide taper abuts the second tapered section of the waveguide core.

4. The structure of claim 2 wherein the first waveguide taper has a width dimension that increases with decreasing distance from the multiple-layer structure.

5. The structure of claim 4 wherein the first waveguide taper is terminated at an end that is longitudinally spaced from the multiple-layer structure.

6. The structure of claim 1 further comprising:
   a substrate,
   wherein the first tapered section of the waveguide core is positioned in a vertical direction between the first waveguide taper and the substrate.

7. The structure of claim 6 wherein the second tapered section of the waveguide core is positioned in the vertical direction between the second waveguide taper and the substrate.

8. The structure of claim 1 further comprising:
a dielectric layer positioned in a vertical direction between the first tapered section of the waveguide core and the first waveguide taper, the dielectric layer comprising a dielectric material.

9. The structure of claim 8 wherein the dielectric layer is positioned in the vertical direction between the second tapered section of the waveguide core and the second waveguide taper.

10. The structure of claim 1 wherein the multiple-layer structure is a multiple quantum well.

11. The structure of claim 1 wherein the waveguide core comprises a first material, and the first waveguide taper and the second waveguide taper comprise a second material different from the first material.

12. The structure of claim 11 wherein the first material is silicon, and the second material is silicon nitride.

13. The structure of claim 1 further comprising:
a third waveguide taper overlapping the first waveguide taper, the first waveguide taper positioned in a vertical direction between the third waveguide taper and the first tapered section of the waveguide core.

14. The structure of claim 13 further comprising:
a fourth waveguide taper overlapping the second waveguide taper, the second waveguide taper is positioned in the vertical direction between the fourth waveguide taper and the second tapered section of the waveguide core.

15. The structure of claim 1 wherein the first end portion is tapered, and the second end portion is tapered.

16. The structure of claim 1 further comprising:
a dielectric layer on the multiple-layer structure, the dielectric layer including a first portion between the first tapered section of the waveguide core and the first waveguide taper, and the dielectric layer including a second portion between the second tapered section of the waveguide core and the second waveguide taper.

17. A structure comprising:
a waveguide core including a first tapered section, a second tapered section, and a longitudinal axis, the first tapered section and the second tapered section aligned along the longitudinal axis;
a first waveguide taper overlapping the first tapered section of the waveguide core;
a second waveguide taper overlapping the second tapered section of the waveguide core;
a multiple-layer structure on the waveguide core between the first waveguide taper and the second waveguide taper,
a third waveguide taper adjacent to the multiple-layer structure; and
a fourth waveguide taper adjacent to the multiple-layer structure,
wherein the first waveguide taper wraps around the third waveguide taper, and the second waveguide taper wraps around the fourth waveguide taper.

18. The structure of claim 17 wherein the first waveguide taper and the second waveguide taper comprise a first material, and the third waveguide taper and the fourth waveguide taper comprise a second material different from the first material.

19. The structure of claim 17 wherein the multiple-layer structure has a first end portion and a second end portion opposite to the first end portion, the first waveguide taper further wraps around the first end portion, and the second waveguide taper further wraps around the second end portion.

20. A method comprising:
forming a waveguide core including a first tapered section, a second tapered section, and a longitudinal axis, wherein the first tapered section and the second tapered section are aligned along the longitudinal axis;
forming a first waveguide taper overlapping the first tapered section of the waveguide core;
forming a second waveguide taper overlapping the second tapered section of the waveguide core; and
forming a multiple-layer structure on the waveguide core between the first waveguide taper and the second waveguide taper,
wherein the multiple-layer structure has a first end portion and a second end portion opposite to the first end portion, the first waveguide taper wraps around the first end portion, and the second waveguide taper wraps around the second end portion.

* * * * *